No. 658,877. Patented Oct. 2, 1900.
J. C. W. STANLEY.
APPARATUS FOR TREATING COTTON SEED.
(Application filed Mar. 28, 1900.)
(No Model.)
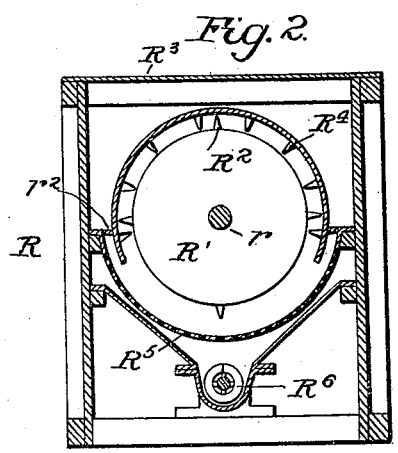
Fig. 2.
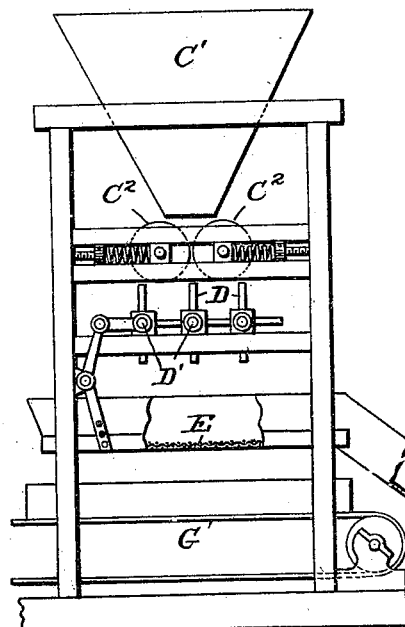
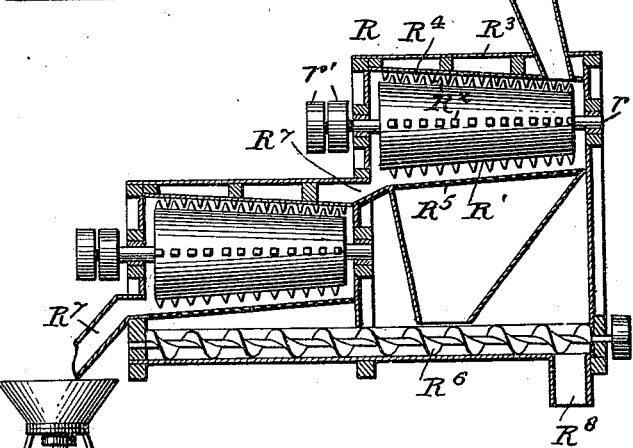
Fig. 1.
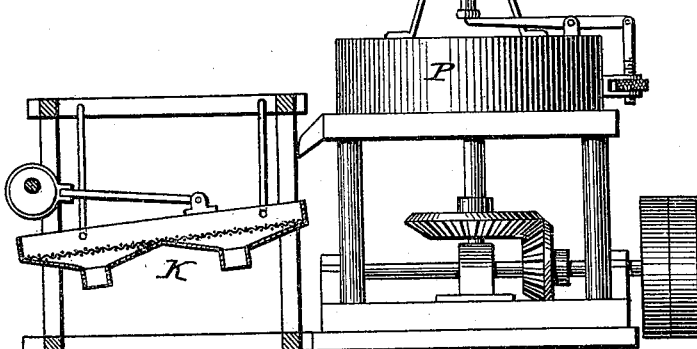
Witnesses
Inventor
John Charles William Stanley
By Foster & Freeman
Attorneys

UNITED STATES PATENT OFFICE.

JOHN CHARLES WILLIAM STANLEY, OF LONDON, ENGLAND, ASSIGNOR TO THE COTTON SEED OIL SYNDICATE, LIMITED, OF SAME PLACE.

APPARATUS FOR TREATING COTTON-SEED.

SPECIFICATION forming part of Letters Patent No. 658,877, dated October 2, 1900.

Application filed March 28, 1900. Serial No. 10,575. (No model.)

*To all whom it may concern:*

Be it known that I, JOHN CHARLES WILLIAM STANLEY, a subject of the Queen of England, residing in London, England, have invented certain new and useful Improvements in Apparatus for the Treatment of Cotton-Seed, of which the following is a specification.

Heretofore in practice it has been found extremely difficult to successfully and economically treat the hulls of the cotton-seed after the kernel has been roughly separated from them for the purpose of reducing the hulls to meal, and, as a matter of fact, such hulls, with the cotton adhering to them, are at the present time mostly used for fertilizing purposes.

The object of my present invention is to provide a mechanism by means of which such hulls may be successfully treated and converted into meal free of cotton and kernel, so that a pure hull-meal is produced.

In the accompanying drawings, Figure 1 is an elevation, partly in section, of an apparatus embodying my invention. Fig. 2 is a transverse sectional elevation of the screening-carder.

The cotton-seed after being subjected to a preliminary treatment for the purpose of removing the debris therefrom is fed into the hopper C', from whence it passes to cracking-rollers $C^2$, which crack the seeds, and the cracked seeds fall from the rollers onto threshing-arms D. These arms are mounted upon parallel shafts D', which may be driven in any suitable manner. The threshing-arms D intercalate, and their function is to disintegrate the cracked seed, separate the kernel from the hulls, and reduce the kernel to a finely-divided state. After passing the threshing-arms D the material falls onto a reciprocating screen E, and the broken kernels, together with small fragments of hull and some free cotton, pass through the reciprocating screen onto a traveling belt G, which conveys it to suitable apparatus for further treatment, which apparatus, as it forms no part of my present invention, need not be illustrated or further referred to. The tailings from the screen E, which consist of the major portions of the hulls to which fragments of the kernel still adhere, and to which also adheres the greater portion of the cotton, are delivered onto a traveling band F, which carries them to a screening-carder R. This carder comprises a conical drum R', carrying on its periphery a series of rows of spikes or teeth $R^2$. The drum is carried by a shaft $r$, which is provided with driving-pulleys $r'$, one of which is fast and the other loose upon said shaft. An imperforate casing $R^3$, concentric with the drum, incloses the upper portion of the latter and extends around about two-thirds of the periphery of the drum and is open at its lower side. This casing is provided on its interior with a series of rows of spikes or teeth $R^4$, which teeth are so arranged as to intercalate with the teeth $R^2$ of the drum. A concave screen $R^5$, concentric with the drum and the casing $R^3$, is supported below the drum, and the longitudinal edges of the screen overlap the longitudinal edges of the casing $R^3$. The overlapping portion of the screen and casing are separated from each other a distance about equal to the length of the teeth $R^2$ or $R^4$, and the spaces between them are bridged by plates (indicated by $r^2$) in order to prevent the escape of any of the material between them. The material is delivered from the belt F to the space between the casing $R^3$ and the drum R' at the small end of the drum and to one side of the vertical center thereof. Immediately below the screen is a hopper, into which the material which passes from the screen falls and is delivered into a trough, from which it is conveyed by a worm $R^6$ to a delivery-spout $R^8$ to undergo a subsequent treatment, which need not be referred to herein, as it forms no part of the present invention.

As illustrated in the drawings, the tailings from the screen $R^5$ are delivered by a spout $R^7$ to another screening-carder which is similar in all respects to the one just described, and while in practice it has been found advantageous to have the screening-carders in duplicate it is not absolutely essential. From the second screening-carder the tailings pass through spout $R^7$ to a grinding-mill P. These tailings, which consist of the tougher portions of the hull with the cotton adhering to them, are reduced to a finely-divided condition by the grinding-mill, and the ground product is delivered from the grinding-mill onto a fine-meshed reciprocating screen K, through which the hull-meal will sift, while the cotton will form into rolls or balls of fluff upon the upper surface of the screen, from which they may be readily removed.

As before stated, the tailings from the screen E consist of the major portion of the hulls of the cotton-seeds, to which adhere most of the cotton present on the seed before it was cracked and disintegrated and also fragments of the kernel. The screening-carder is a very important part of the apparatus, for by its action on the tailings the cotton on the hulls, which is in a more or less matted or interlaced condition, is opened up and all the fragments of kernel which still adhere to the interior of the hulls or which may have become matted in the cotton are separated therefrom. At the same time small fragments of the hull and also some small portion of the cotton will be separated from the larger fragments of the hull and all these fragments of kernel, small pieces of hull, and free cotton will be forced through the screen $R^5$. In actual practice the entire space between the screen $R^5$, the casing $R^3$, and the drum will be filled with the tailings from the screen E, and they will gradually work from the small end of the drum to the tailing-off end, and during such movement longitudinally through the machine they will be carried around peripherally of the drum and subjected to the action of the intercalating teeth many times.

In actual tests of the machine it has been found that there is practically no kernel in the tailings from the first carder and none whatever in the tailings from the second carder when they are used in duplicate.

Without limiting myself to the precise details of construction illustrated in the various parts of the apparatus, what I claim as new, and desire to secure by Letters Patent, is—

1. In an apparatus for treating cotton-seed, the combination of cracking-rollers, disintegrating mechanism to which the cracked seed is delivered, a screen for roughly separating the kernel from the hulls and onto which the disintegrated material falls, mechanism for opening up the cotton on the hulls and separating fragments of kernel therefrom, a grinding-mill to which the hulls and adhering cotton are delivered, and a reciprocating screen onto which the ground hulls and cotton are delivered and which separates them, substantially as set forth.

2. In an apparatus for treating cotton-seed, the combination of cracking-rollers, disintegrating mechanism to which the cracked seed is delivered, a screen for roughly separating the kernel from the hulls and onto which the disintegrated material falls, a screening-carder to which the roughly-separated hulls are delivered, said carder comprising a rotary-toothed conical drum, an imperforate casing concentric with and surrounding the upper portion of the drum and provided on its interior with teeth which intercalate with the teeth of the drum, and a screen concentric with and inclosing the lower portion of the drum, a grinding-mill to which the tailings from the screening-carder are delivered, and a reciprocating screen onto which the ground material is delivered and which separates the hull-meal from the cotton, substantially as set forth.

3. In a screening-carder for treating cotton-seed hulls, the combination of a toothed conical drum, a casing provided internally with teeth intercalating with those of the drum, said casing extending nearly around the drum and having an opening at the bottom directly under the drum, and a concave screen concentric with the drum and casing and in close proximity thereto.

4. In a screening-carder for treating cotton-seed hulls, the combination of a toothed conical drum, an imperforate casing provided internally with teeth intercalating with those of the drum, said casing extending nearly around the drum and having an opening directly under the drum and extending the whole length thereof, a concave screen supported below the drum and concentric with it and the casing, the longitudinal edges of the screen overlapping the longitudinal edges of the casing, and plates bridging the spaces between said overlapping ends.

5. In a screening-carder for treating cotton-seed hulls, the combination of a toothed conical drum, an imperforate casing provided internally with teeth intercalating with those of the drum and open on its under side throughout its length, a concave screen concentric with the casing and the drum and placed directly below and in close relation to the opening of the casing, a spout for discharging the overtails of the screen, and a trough and conveyer below the screen for taking away the finer material.

In testimony whereof I have signed my name to this specification in the presence of two subscribing witnesses.

JOHN CHARLES WILLIAM STANLEY.

Witnesses:
A. H. GREENWOOD,
W. M. HARRIS.